(12) United States Patent
Mitsugi (10) Patent No.: US 7,822,542 B2
(45) Date of Patent: Oct. 26, 2010

(54) LOCATION INFORMATION EXCHANGE APPARATUS AND LOCATION INFORMATION EXCHANGE METHOD

(75) Inventor: Tatsuya Mitsugi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 172 days.

(21) Appl. No.: 11/992,062

(22) PCT Filed: Sep. 7, 2006

(86) PCT No.: PCT/JP2006/317785
§ 371 (c)(1),
(2), (4) Date: Mar. 14, 2008

(87) PCT Pub. No.: WO2007/066439
PCT Pub. Date: Jun. 14, 2007

(65) Prior Publication Data
US 2009/0157306 A1   Jun. 18, 2009

(30) Foreign Application Priority Data
Dec. 9, 2005   (JP)   ............................. 2005-356647

(51) Int. Cl.
*G01C 21/30* (2006.01)
(52) U.S. Cl. .................. 701/208; 701/201; 701/300; 340/993; 340/995.23
(58) Field of Classification Search .................. 701/201, 701/207, 208, 209, 300; 340/988, 990, 993, 340/995.17, 995.23; 342/357.1
See application file for complete search history.

(56) References Cited

U.S. PATENT DOCUMENTS 5,970,511 A * 10/1999 Kurita et al. ................. 711/202
6,178,377 B1    1/2001 Ishihara et al.

FOREIGN PATENT DOCUMENTS

| JP | 2001-41757 A | 2/2001 |
| JP | 2001-66146 A | 3/2001 |
| JP | 3143927 B2 | 3/2001 |
| JP | 2002-62158 A | 2/2002 |

OTHER PUBLICATIONS

Christoph Henning; "Toscana und Latium"; p. 87, DuMont (1986).
Ichi Joho Hyogen Keishiki Guideline POIX_EX (ITS Forum RC-001), 2nd edition, Apr. 28, 2003.

* cited by examiner

*Primary Examiner*—Gertrude Arthur Jeanglaud
(74) *Attorney, Agent, or Firm*—Birch, Stewart, Kolasch and Birch, LLP (57) ABSTRACT

A location information exchange apparatus includes an information acquisition unit 4 for acquiring point information indicating an exchange point whose location is to be exchanged from a map database 6 according to an instruction from outside the apparatus; an information conversion unit 3 for converting this point information into location information comprised of specific point information 3 indicating a specific point which exists in common among map databases and related information 9 indicating a relative location with respect to this specific point; and a communications unit 2 for transmitting point exchange information 29 including the location information to outside the apparatus. The communications unit further receives point exchange information from outside the apparatus, and the information conversion unit converts location information included in the received point exchange information into point information, and determines an exchange point on the map database on the basis of the point information.

11 Claims, 6 Drawing Sheets

LOCATION INFORMATION EXCHANGE APPARATUS AND LOCATION INFORMATION EXCHANGE METHOD

FIELD OF THE INVENTION

The present invention relates to a location information exchange apparatus for and a location information exchange method of performing exchange and distribution of location information for a system which provides map information and location information, a location based service (Location Based Service), and so on. More particularly, it relates to a technology of transmitting the location of the same point on different maps exactly and efficiently.

BACKGROUND OF THE INVENTION

In recent years, car navigation apparatuses which guide a driver while displaying a map, mobile phones which can use a map information service, servers which provide a map information service via the Internet, etc. have been increasing. These pieces of equipment and servers hold various map databases, and provide users with information about points which they desire, i.e., so-called POI (Point Of Interest) information, on the basis of latitude and longitude data which are stored in those map databases.

Because a map database held by each equipment is based on a closed system (Closed System) and the maker and the creation year of a map database which is used by the same type of equipment are identical, there is neither displacements in the location of a POI nor variations in the expression of a POI. However, when exchange and distribution of map information and location information are carried out between equipment holding a map database and other equipment, particularly other equipment which uses a different maker's map database, because this system is an open system (Open System), there may be a case in which a displacement occurs in the location of a POI or a variation occurs in the expression of a POI according to the difference between the map databases used by those pieces of equipment, and the POI is shown as a different location or a different expression in spite of indicating the same point.

Furthermore, even in a case in which the same maker's map database is used, when the creation year of the map database differs, a change occurs in the relative relation between a POI and roads due to new construction of a building, new construction or change of a road, or the like, that is, a change occurs in the access to the POI or in the name of the POI. As a result, there is a case in which even if a POI shows the same point, the location or name of the POI differs according to the creation year of the map database.

For example, in the VICS (Vehicle Information and Communication System), in a case in which a road is constructed newly or changed, addition of a new node number and a link number or replacement of a node number and a link number are performed on the map database of the VICS. When a node number and a link number are changed in the VICS, there will be a necessity to update each maker's map database. Because new construction and change of roads are continuously made over the future, and therefore maintenance of the original map database and change of each maker's map database become a matter of necessity as long as the method of changing the original map database by performing addition or replacement of a node number and a link number is adopted, there is a problem that a large amount of work and a cost carried by this work must be supplied permanently.

In order to solve this problem, patent reference 1 discloses a location information transmission method of being able to transmit location information on a digital map without having an excessive load of maintenance. In accordance with this location information transmission method, an information provision side, in order to inform a road location, transmits both road shape data comprised of a series of coordinates indicating the road geometry of a road section of a predetermined length including that road location, and relative data indicating a road location within this road section, and a receive side which receives these pieces of information performs shape matching, specifies the road section on the digital map, and determines the road location within the road section by using the relative data.

According to the location information transmission method disclosed by this patent reference 1, even if neither node numbers nor link numbers are defined, the information provision side simply provides road shape data indicating the geometry of a road in the form of a series of coordinates so that the receive side can determine the location of the road. This location information transmission method can be used for exchange of traffic information between traffic information collection centers, provision of traffic information from either an FM station or a road beacon, and so on.

However, the location information transmission method disclosed by this patent reference 1 has a drawback of increasing the amount of data to be transmitted because the location information about the locations of many points on the road must be transmitted in order to inform the road geometry exactly. Reduction in the number of points on the road whose location information is to be transmitted to the receive side in order to remove the drawback raises the possibility of causing incorrect matching in the receive side.

To solve this problem, patent reference 2 discloses a location information transmission method of exchanging location information about locations on a digital map with a small amount of data and with a high degree of accuracy, and without having a load of maintenance. According to this location information transmission method, when transmitting a road location on the digital map, an information provision side transmits, as road location information, coordinate series information indicating the road geometry of a road section including the road location and having a length according to a situation, additional information containing at least one of attribution information about attributes of the road including the road location and detailed information about nodes within the road section, and relative information indicating the road location within the road section, and a receive side which receives this road location information performs shape matching so as to specify the road section on the digital map, and determines the road location within this road section by using the relative data.

According to the location information transmission method disclosed by this patent reference 2, the information provision side transmits the additional information, as well as the coordinate series information, to the receive side so that the receive side can specify the road geometry with a high degree of accuracy even though the amount of data of the coordinate series is small, and therefore the amount of transmission data can be reduced and the high-accuracy determination of the road location can be made by the receive side.

[Patent reference 1] JP,2001-041757,A

[Patent reference 2] JP,2001-066146,A

However, a problem which remains to be solved by the technology disclosed by above-mentioned patent reference 2 is that information about the road section, i.e., information about start and end points of the road is required and whether or not there is a match in the road location between the different map databases cannot be judged correctly. Furthermore, while the technology disclosed by patent reference 2 provides a smaller amount of information to be transmitted than the technology disclosed by patent reference 1, the technology disclosed by patent reference 2 requires a large amount of information because it needs road geometry information about many points.

In addition, the receive side needs to perform shape matching on the basis of the road geometry information transmitted thereto, and the structure of the receive side becomes complicated. A further problem is that the receive side cannot handle a large change in the shape of the road because the receive side uses the shape matching.

The present invention is made to solve the above-mentioned problems, and it is therefore an object of the present invention to provide a location information exchange apparatus for and a location information exchange method of being able to exchange correct location information between apparatuses which have different map databases through transmission of a small amount of data in spite of having a simple structure.

DISCLOSURE OF THE INVENTION

In accordance with the present invention, there is provided a location information exchange apparatus including: a map database for storing map information; an information acquisition means for acquiring point information indicating an exchange point whose location is to be exchanged from the map database according to an instruction from outside the location information exchange apparatus; an information conversion means for converting the point information acquired by the information acquisition means into location information which is comprised of specific point information indicating a specific point which exists in common among a plurality of map databases and related information indicating a relative location with respect to this specific point; and a communications means for transmitting point exchange information including the location information acquired through the conversion by the information conversion means to outside the location information exchange apparatus. Furthermore, the communications means receives point exchange information from outside the location information exchange apparatus, and the information conversion means converts location information included in the point exchange information received by the communications means into point information, and determines an exchange point on the map database on a basis of the point information which is acquired through the conversion.

In accordance with the present invention, there is provided a location information exchange method including the steps of: acquiring point information indicating an exchange point whose location is to be exchanged from a map database according to an instruction from outside; converting this acquired point information into location information which is comprised of specific point information indicating a specific point which exists in common among a plurality of map databases and related information indicating a relative location with respect to this specific point; and transmitting point exchange information including the location information acquired through the conversion to outside. Furthermore, in the step of transmitting the point exchange information to outside, point exchange information is received from the outside, and, in the step of converting into point exchange information, location information included in the received point exchange information is converted into point information and an exchange point on the map database is determined on a basis of point information which is acquired through said conversion.

According to the present invention, the point information indicating the exchange point whose location is to be exchanged is converted into the location information which is comprised of the specific point information indicating the specific point which exists in common among a plurality of map databases and the related information indicating the relative location with respect to this specific point, and the point exchange information including this location information is transmitted and received. Therefore, without having to use any complicated method, the exchange point can be informed correctly to the other party as the same point in different digital map databases. Furthermore, because only simple information including the specific point and its related information is used, the amount of transmission data used for informing the location information can be reduced greatly.

PREFERRED EMBODIMENTS OF THE INVENTION

Hereafter, in order to explain this invention in greater detail, the preferred embodiments of the present invention will be described with reference to the accompanying drawings.

Embodiment 1

A location information exchange apparatus and a location information exchange method in accordance with Embodiment 1 of the present invention are formed in such a way as to exchange location information about the location of a point, which desires to be exchanged, by using a specific point which exists in common between different digital map databases (simply referred to as "map databases" from here on), and its related information.

Figure 1:
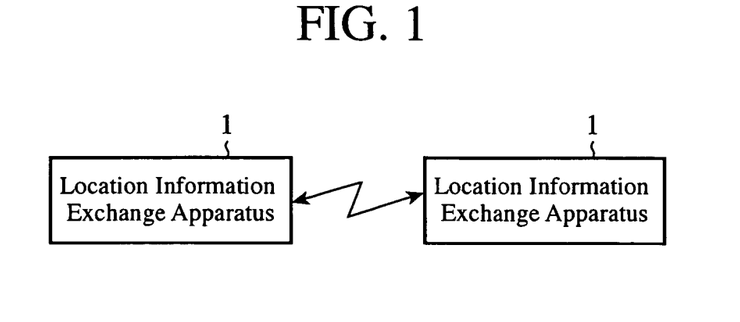
FIG. 1 is a diagram showing the structure of a map information/location information providing service system using a location information exchange apparatus in accordance with Embodiment 1 of the present invention.

FIG. 1 is a diagram showing the structure of a map information/location information providing service system which uses the location information exchange apparatus in accordance with Embodiment 1 of the present invention. This map information/location information providing service system is comprised of a plurality of location information exchange apparatuses 1, and each location information exchange apparatus 1 has a transmitting and receiving function. In this map information/location information providing service system, an exchange of location information is carried out between one location information exchange apparatus 1 which functions as a transmit side and one location information exchange apparatus 1 which functions as a receive side.

Figure 2:
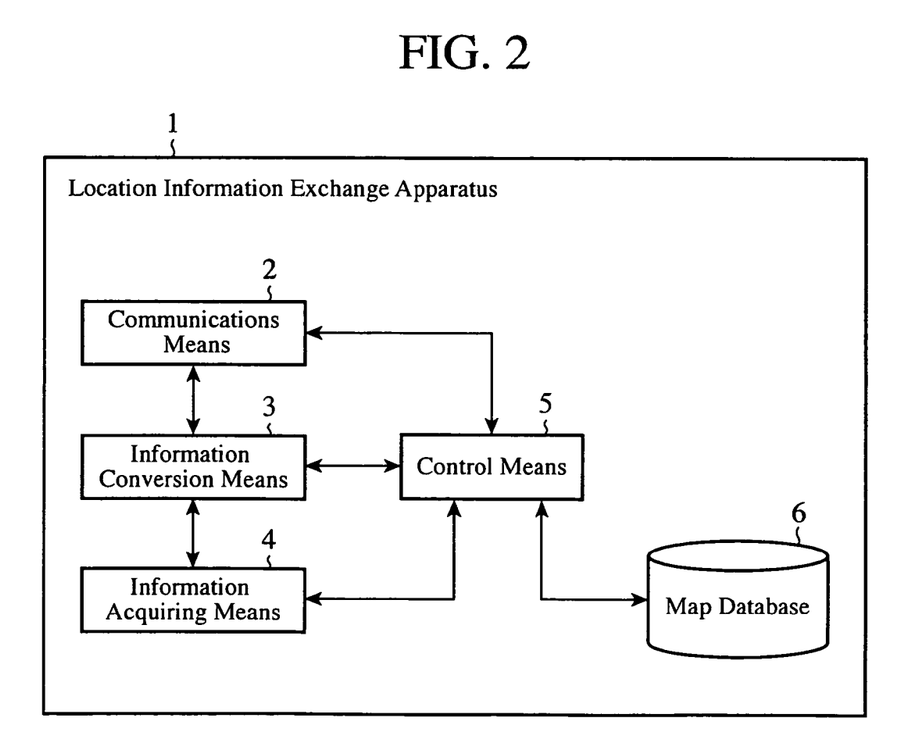
FIG. 2 is a block diagram showing the structure of the location information exchange apparatus in accordance with Embodiment 1 of present invention.

FIG. 2 is a block diagram showing the structure of a location information exchange apparatus 1 for use in the above-mentioned map information/location information providing service system. The location information exchange apparatus 1 is comprised of a communications means 2, an information conversion means 3, an information acquisition means 4, a control means 5, and a map database 6.

The communications means 2 controls communications which are carried out between the location information exchange apparatus 1 in question and another location information exchange apparatus 1. Concretely, the communications means 2 transmits point exchange information sent from the information conversion means 3 to outside the location information exchange apparatus and also sends point exchange information received from outside the location information exchange apparatus to the information conversion means 3 according to control by the control means 5. The information conversion means 3 converts point information sent from the information acquisition means 4 into point exchange information including location information and sends this point exchange information to the communications means 2, and also converts location information included in point exchange information sent from the communications means 2 into point information and sends this point information to the control means 5 according to control by the control means 5.

As will be mentioned later in detail, point information is information indicating an exchange point whose location is to be exchanged, location information is information indicating an exchange point with specific point information and related information, and point exchange information is information transmitted and received among a plurality of location information exchange apparatuses and is the one in which map database information is added to location information.

The information acquisition means 4 acquires point information indicating a point whose location desires to be exchanged (referred to as an "exchange point" from here on) from the map database 6 via the control means 5 according to control by the control means 5, and sends the point information to the information conversion means 3. The control means 5 controls the whole of this location information exchange apparatus. The map database 6 stores map data. The description of this map database 6 is read by the control means 5.

Figure 3:
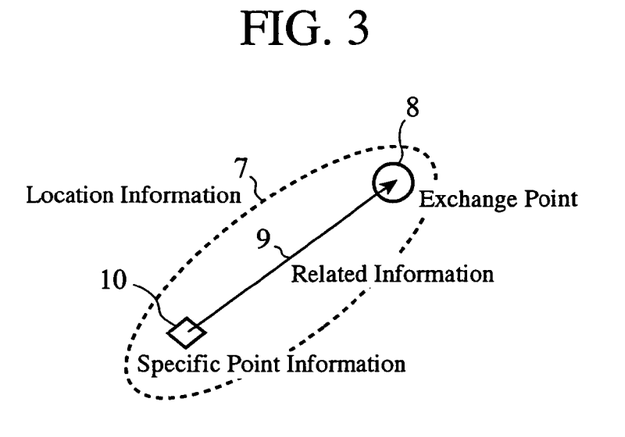
FIG. 3 is a diagram showing the structure of location information for use in the location information exchange apparatus in accordance with Embodiment 1 of present invention.

FIG. 3 is a diagram showing the structure of location information 7 for use in the location information exchange apparatus 1. This location information 7 is comprised of specific point information 10 and related information 9, and an exchange point 8 is shown by these specific point information 10 and related information 9.

The specific point information 10 is the one for specifying a specific point. In order to be able to guarantee that a specific point is an identical point among different map databases, as the specific point, a point with little revision and abolition, e.g., at least one of "a reference point in a map section", "an intersection which serves as the start point of a pass road or a sidewalk", "an entrance in a building", "a landmark meaning a specific place in the real world", "a famous point, such as a place of natural beauty or historic interest," and "a reference point determined by a public institution" is used. By using, as a specific point, such a point which is handled by any map database and whose location can be exchanged between map databases, an exchange of location information between different map databases can be guaranteed.

Figure 4:
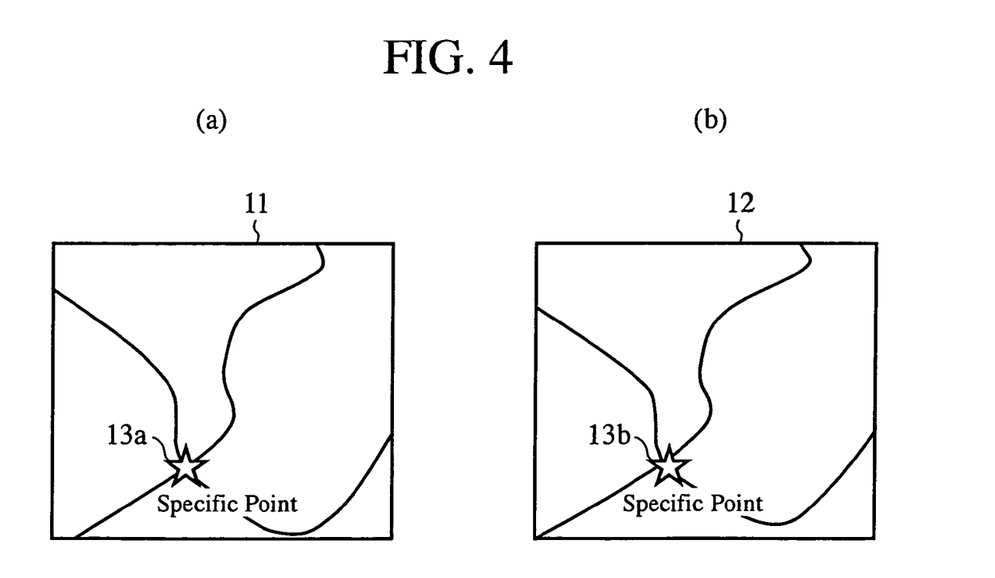
FIG. 4 is a diagram for explaining a state in which a specific point for use in the location information exchange apparatus in accordance with Embodiment 1 of the present invention shows the same location in a different map database.

FIG. 4 shows a state in which specific points in different map databases show the same location. It is guaranteed that a specific point 13a in a section of a map database 11 as shown in FIG. 4(a) and a specific point 13b in a section of another map database 12 as shown in FIG. 4(b) show the same point, though there is some difference between maps which are shown on the basis of the map databases.

Figure 5:
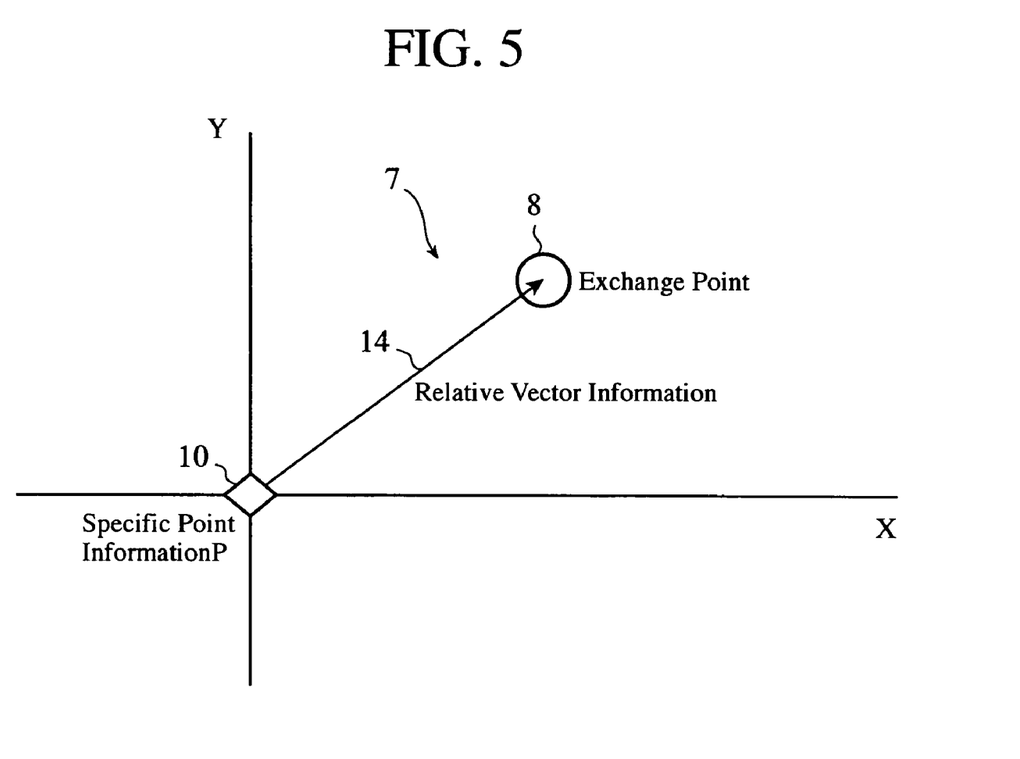
FIG. 5 is a diagram showing a two-dimensional representation of the structure of the location information in a case in which related information for use in the location information exchange apparatus in accordance with Embodiment 1 of the present invention is relative vector information.

The related information 9 is the one for specifying a relative location of the exchange point 8 with respect to the specific point. As the related information 9, either relative vector information or relative route information is used. FIG. 5 is a diagram showing a two-dimensional expression of the structure of the location information 7 in a case in which the related information 9 is relative vector information. The related information 9 is comprised of the specific point information 10 and the relative vector information 14 which consists of a distance and a direction from a reference point to the exchange point 8 on coordinate axes X and Y, the specific point specified by the specific point information 10 being defined as the reference point.

According to the structure of this location information 7, because the exchange point 8 is specified by the specific point information 10 which is the information about the specific point and the related information 9 which is the relative vector information 14, the flexibility becomes higher than that in the case of using a method of exchanging the information about the exchange point 8 directly, while a variation in the expression and a displacement of the location become difficult to occur. In addition, according to the structure of this location information 7, an approximate location of the exchange point 8 is determined from the specific point information 10, and it is uniquely expressed by the relative vector information 14 how much distant the exchange point 8 is away from the specific point and in which direction the exchange point 8 is oriented from the specific point.

Figure 6:
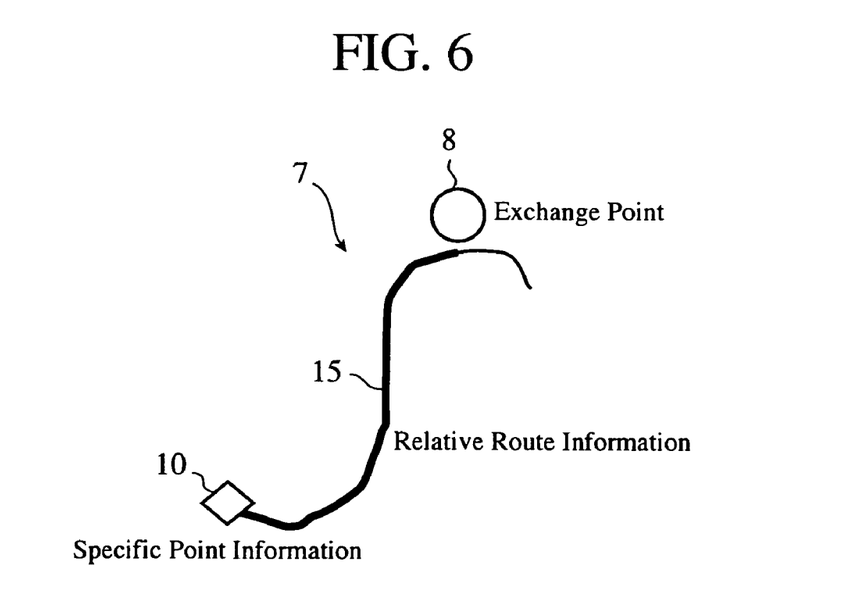
FIG. 6 is a diagram showing the structure of the location information in a case in which the related information for use in the location information exchange apparatus in accordance with Embodiment 1 of the present invention is relative route information.

FIG. 6 is a diagram showing the structure of the location information 7 in a case in which the related information 9 is relative route information 15. The related information 9 is comprised of the specific point information 10 and the relative route information 15 indicating a route from a reference point to the exchange point 8, the specific point specified by this specific point information 10 being defined as the reference point.

According to the structure of this location information 7, because the exchange point 8 is specified by the specific point information 10 which is the information about the specific point and the relative route information 15 about the route to the point 8 whose location information is to be exchanged, the flexibility becomes higher than that in the case of using a method of exchanging the information about the exchange point 8 directly, while a variation in the expression and a displacement of the location become difficult to occur. In addition, according to the structure of this location information 7, both a method of accessing to the exchange point 8 and whether the exchange point 8 is located on a right-hand side or on a left-hand side at the time of accessing to the exchange point can be expressed.

As mentioned above, by expressing the exchange point 8 with the specific point information 10 and the related information 9, an abstraction of the exchange point 8 can be made and the flexibility becomes higher than that in the case of using a method of exchanging the information about the exchange point 8 directly, while a variation in the expression and a displacement of the location become difficult to occur. Furthermore, the guarantee of the identity of locations between different map databases is ensured by defining, as a reference point, a point which is called a specific point and which is guaranteed to be exchanged between the different map databases, and by determining the exchange point 8 by using related information 9 indicating a relative location from the reference point. Therefore, the present embodiment makes it possible to absorb a variation in the expression of the exchange point 8, which is an arbitrary point, and a difference in the location of the exchange point 8 between the different map databases.

Figure 7:
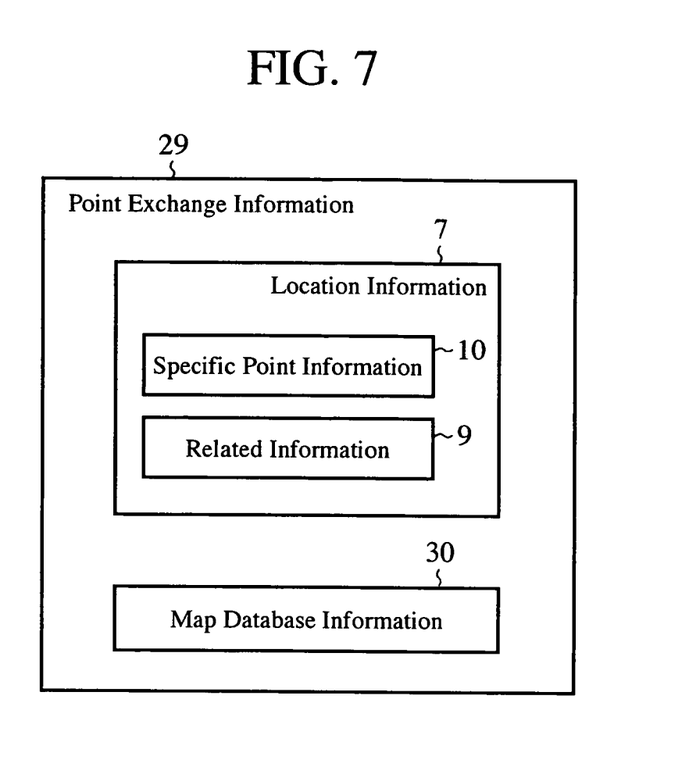
FIG. 7 is a diagram showing the structure of point exchange information for use in the location information exchange apparatus in accordance with Embodiment 1 of the present invention.

FIG. 7 is a diagram showing the structure of point exchange information 29 which is exchanged among a plurality of location information exchange apparatuses 1. This point exchange information 29 has a layered structure. The point exchange information 29 is comprised of the location information 7 and the map database information 30. The location information 7 is comprised of the specific point information 10 and the related information 9, as mentioned above. Although the location information 7 is indispensable to the point exchange information 29, the map database information 30 is optional. In a case in which the point exchange information 29 includes the map database information 30, a location information exchange apparatus which is a receive side at the time of exchanging the point exchange information 29 can improve quality and expressional flexibility.

Figure 8:
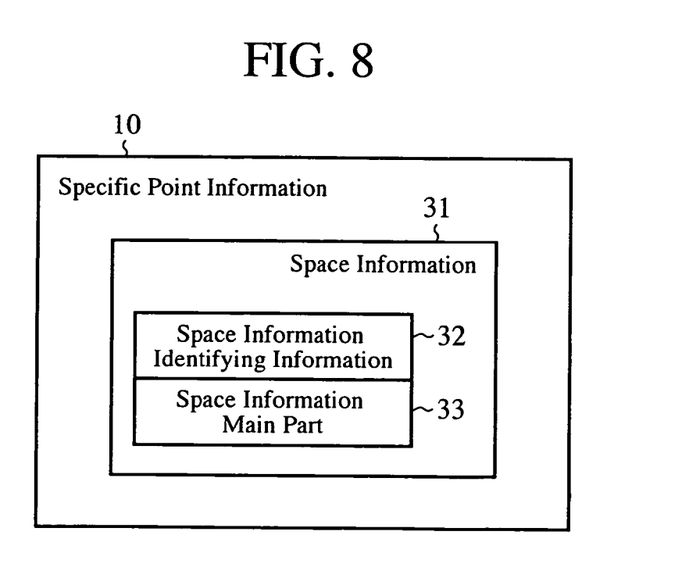
FIG. 8 is a diagram showing the structure of specific point information for use in the location information exchange apparatus in accordance with Embodiment 1 of the present invention.

FIG. 8 is a diagram showing the structure of the specific point information 10. This specific point information 10 has a layered structure. The specific point information 10 is comprised of space information 31, and the space information 31 is comprised of space information identification information 32 and a main part 33 of the space information.

The space information identification information 32 is information for identifying the description of the space information main part 33. As the space information identification information 32, at least one of a "name", an "ID", and "coordinates" can be used. In order to make the specific point identifiable with respect to time, time information can be included in each of a "name", an "ID", and "coordinates". As a result, an exchange of a location in both space and place including a time between different map databases is guaranteed.

In a case in which a "name" is used as the space information identification information 32, a name showing the specific point, such as "Miwa intersection", is stored in the space information main part 33. In a case in which an "ID" is used as the space information identification information 32, an ID showing the specific point, such as "2721928", is stored in the space information main part 33.

In a case in which "coordinates" are used as the space information identification information 32, coordinates indicating the specific point, such as "north latitude 34 degree, 53 minute and 36 second, and east longitude 135 degree, 12 minute and 42 second", are stored in the space information main part 33. In a case of expressing the specific point as "coordinates", "space coordinates specific information for specifying space coordinates, such as axes of coordinates", or "absolute space coordinates having a three-dimensional space and time" is provided, and the specific point can be formed in such a way that an exchange of a location in both space and place can be guaranteed. Furthermore, by using "latitude and longitude" or "plane rectangular coordinates" as the "space coordinates specific information" or the "absolute space coordinates", the compatibility with an existing system can be provided.

The space information identification information 32 can also be formed into structured information in such a manner as to show the class of the description of the space information main part 33. Because the specific point is a "reference point in a map section", an "intersection which serves as the start point of a pass road or a sidewalk", an "entrance in a building", a "landmark meaning a specific place in the real world", a "famous point, such as a place of natural beauty or historic interest," a "reference point determined by a public institution", or the like, the specific point can be formed in such a way as to have a "name", an "ID", or "coordinates", and to also express a "reference point in a map section", an "intersection which serves as the start point of a pass road or a sidewalk", an "entrance in a building", a "landmark meaning a specific place in the real world", a "famous point, such as a place of natural beauty or historic interest," a "reference point determined by a public institution", or the like. In this case, for example, the specific point is expressed as "intersection: name".

The space information main part 33 can also be formed into structured information in such a way that a search can be easily carried out in the reception processing. For example, in a case of using a name, the space information main part is expressed as "Sanda-shi, Hyogo: Miwa intersection". In a case of using an ID, the space information main part can be expressed as, for example, "27.219.28". In the example of this ID, using city, town and village codes, the high most two digits show the number of the prefecture, the following three digits show the number of the city, town or village, and the remaining two digits show the intersection number.

The space information 31 comprised of the space information identification information 32 and the space information main part 33, i.e., the specific point information 10 can be expressed in the form of XML (Extensible Markup Language). For example, when the specific point information is expressed as follows:

```
<SPECIFIC POINT INFORMATION>
<NAME CLASS="intersection" REGION="Sanda-shi, Hyogo">
Miwa intersection
</NAME>
</SPECIFIC POINT INFORMATION>,
``` the tag <SPECIFIC POINT INFORMATION> declares that the description of the information starting from this tag is specific point information, the tag <NAME CLASS="intersection" REGION="Sanda-shi, Hyogo"> declares that the main part of the information shows a "name", the description of the information belongs to intersections, and the region is Sanda-shi, Hyogo, and "Miwa intersection" expresses the main part of the information. The tags </NAME> and </SPECIFIC POINT INFORMATION> are termination processes of the corresponding tags, respectively.

As an alternative, by expressing the specific point information in the XML form as follows:

```
<SPECIFIC POINT INFORMATION>
<NAME CLASS="intersection" REGION="Sanda-shi, Hyogo">
Miwa intersection
</NAME>
<ID CLASS="intersection">27.219.28
</ID>
<COORDINATES CLASS="intersection">
<LATITUDE NORTH AND SOUTH="north latitude" UNIT="degree minute second">345336
</LATITUDE>
<LONGITUDE EAST AND WEST="east longitude" UNIT="degree minute second">1351242
</LONGITUDE>
</COORDINATES>
</SPECIFIC POINT INFORMATION>,
``` the structure of the specific point information can be clarified and the same point can be expressed in different expressions.

Figure 9:
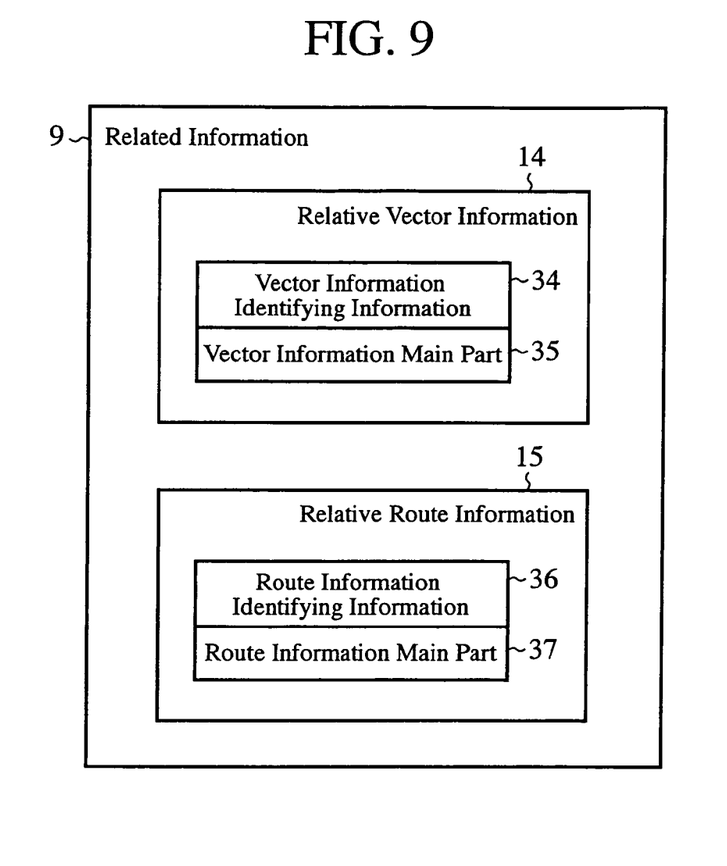
FIG. 9 is a diagram showing the structure of the related information for used in the location information exchange apparatus in accordance with Embodiment 1 of the present invention.

FIG. 9 is a diagram showing the structure of the related information 9. This related information 9 has a layered structure. The related information 9 is comprised of any one of the relative vector information 14 and the relative route information 15.

The relative vector information 14 is comprised of vector information identification information 34 and a main part 35 of the vector information. The vector information identification information 34 is information for identifying the description of the vector information main part 35. As the vector information identification information 34, "a two-dimensional relative direction and a two-dimensional distance defined as planar space=2D", or "a three-dimensional relative direction and a three-dimensional relative distance defined as solid space=3D" can be used. When "2D" is used as the vector information identification information 34, a two-dimensional direction component and a two-dimensional distance are stored in the vector information main part 35. The direction component and the distance can be expressed as a horizontal component X and a vertical component Y in the form of coordinate expression.

When "3D" is used as the vector information identification information 34, a three-dimensional direction component and a three-dimensional distance are stored in the vector information main part 35. The direction component and the distance can be expressed as a horizontal component X, a vertical component Y and a height component Z in the form of coordinate expression.

The relative vector information 14 comprised of the vector information identification information 34 and the vector information main part 35 can be expressed in the XML form. For example, when the relative vector information is expressed as follows:

```
<RELATIVE VECTOR INFORMATION>
<2D EXPRESSION="XY">
<X UNIT="m">
350
</X>
<Y UNIT="m">
-200
</Y>
</2D>
</RELATIVE VECTOR INFORMATION>,
``` the tag <RELATIVE VECTOR INFORMATION> declares that the description of the information starting from this tag is relative vector information, and the tag <2D EXPRESSION="XY"> shows that the following information is the one expressed as XY coordinates indicating "2D", and its description is 350 m in the X direction and -200 m in the Y direction. The tags </X>, </Y>, </2D>, and </RELATIVE VECTOR INFORMATION> are termination processes of the corresponding tags, respectively.

As an alternative, when the relative vector information is expressed as follows:

```
<RELATIVE VECTOR INFORMATION>
<2D EXPRESSION="direction" >
<DIRECTION UNIT="degree">
45
</DIRECTION>
<DISTANCE UNIT="m">
170
</DISTANCE>
</2D>
</RELATIVE VECTOR INFORMATION>,
``` the tag <RELATIVE VECTOR INFORMATION> declares that the description of the information starting from this tag is relative vector information, and the tag <2D EXPRESSION="direction"> shows that the following information is the one expressed as direction and distance of "2D", and its description is a distance of 170 m in a direction of 45 degrees.

In a case of solid space, when the relative vector information is expressed as follows:

```
<RELATIVE VECTOR INFORMATION>
<3D EXPRESSION="XYZ">
<X UNIT="m">
350
</X>
<Y UNIT="m">
-200
</Y>
<Z UNIT="m">
100
</Z>
</3D>
</RELATIVE VECTOR INFORMATION>,
``` the tag <RELATIVE VECTOR INFORMATION> declares that the description of the information starting from this tag is relative vector information, and the tag <3D EXPRESSION="XYZ"> shows that the following information is the one expressed as coordinates indicating "3D", and its description is 350 m in the X direction, -200 m in the Y direction, and 100 m in the Z direction.

The relative route information 15 is comprised of route information identification information 36 and a main part 37 of route information. The route information identification information 36 is information for identifying the description of the route information main part 37. As the route information identification information 36, at least one of "information about roads on a route, and the direction and total distance on the route=outside of facility", "information about a connected side for an end point on the route=connection", and "information about paths in a building on the route, and the direction and total distance on the route=inside of facility" can be used.

When "outside of facility" is used as the route information identification information 36, information about roads on a route, and the direction and total distance on the route are stored in the route information main part 37. When "inside of facility" is used as the route information identification information 36, path information indicating private paths in a facility or paths in a building, and information about the direction and total distance of a route in the path information are stored in the route information main part 37. When "connection" is used as the route information identification information 36, information for specifying a "right-hand side" or a "left-hand side" with respect to an end point on a route is stored in the route information main part 37.

The road information or the path information in the route information main part 37 can be expressed as information having identification information including a "road name or path name", an "ID", a "series of coordinates", and a "series of links". The path information can be expressed as information having identification information including the "name" of a facility in a facility or a building, an "ID", and "coordinates".

The series of coordinates is information for forming a road or a path, and, in a case in which either space coordinates specific information for specifying space coordinates, such as axes of coordinates, or a series of absolute space coordinates having a solid space and a time is provided, a series of latitudes and longitudes or a series of plane rectangular coordinates can be used as the space coordinates specific information and the absolute space coordinate series, respectively. The series of links is information for forming a road or a path, and can be constructed of a series of pieces of information about very-short sections which form the road or the path. The above-mentioned connected side information can be comprised of information about the right-hand side or the left-hand side of a route which can determine a space distant from the end point of the route, and information about the distance from the route.

The relative route information 15 comprised of the route information identification information 36 and the route information main part 37 can be expressed in the XML form. For example, when the relative route information is expressed as follows:

```
<RELATIVE ROUTE INFORMATION>
<OUTSIDE OF FACILITY TYPE="road" CLASS="road name">
National Road No. 176
<DISTANCE UNIT="m" DIRECTION="+">
200
</DISTANCE>
</OUTSIDE OF FACILITY>
<INSIDE OF FACILITY TYPE="facility" CLASS="name">
◯◯, Inc. XX Factory
</INSIDE OF FACILITY>
<INSIDE OF FACILITY TYPE="path" CLASS="name">
```

-continued

```
B path
<DISTANCE UNIT="m" DIRECTION="+">
100
</DISTANCE>
</INSIDE OF FACILITY>
<INSIDE OF FACILITY TYPE="building" CLASS="name">
C201
</INSIDE OF FACILITY>
<INSIDE OF FACILITY TYPE="path" CLASS="name">
Southern entrance
<DISTANCE UNIT="m" DIRECTION="+">
10
</DISTANCE>
</INSIDE OF FACILITY>
<INSIDE OF FACILITY TYPE="path" CLASS="name">
Southern stairs
<DISTANCE UNIT="m" DIRECTION="second floor">
</DISTANCE>
</INSIDE OF FACILITY>
<INSIDE OF FACILITY TYPE="path" CLASS="name">
A path
<DISTANCE UNIT="m" DIRECTION="+">
5
</DISTANCE>
</INSIDE OF FACILITY>
<CONNECTION>
Right
</CONNECTION>
</RELATIVE ROUTE INFORMATION>,
``` the tag <RELATIVE ROUTE INFORMATION> declares that the description of the information starting from this tag is relative route information, the tag <OUTSIDE OF FACILITY TYPE="road" CLASS="road name"> shows that the following information is the one about an outside of a facility, indicating a "road", and expressing the road as a "name", and the description of the information is the national road No. 176, and the tag <DISTANCE UNIT="m" DIRECTION="+"> shows that information about the distance has a unit which is expressed in m, the direction is {+}, and the description is 200, i.e., 200 m in the positive direction.

The next tag <INSIDE OF FACILITY TYPE="facility" CLASS="name"> shows that the following information is the one about an inside of a facility and shows a "facility", and the facility is expressed as a "name" and its description is ◯◯, Inc. x x Factory.

The next tag <INSIDE OF FACILITY TYPE="path" CLASS="name"> shows that the following information is information about an inside of a facility and shows a "path", and the path is expressed as a "name" and its description is a B path, and the tag <DISTANCE UNIT="m" DIRECTION="+"> shows that information about the distance has a unit which is expressed in m, the direction is {+}, and the description is 100, i.e., 100 m in the positive direction.

The next tag <INSIDE OF FACILITY TYPE="building" CLASS="name"> shows that the following information is the one about an inside of a facility and shows a "building", and the building is expressed as a "name" and its description is C201.

The next tags starting from <INSIDE OF FACILITY TYPE="path" CLASS="name"> show that the following information is the one about an inside of a facility and shows a "path", and the path is expressed as a "name" and its description is a southern entrance, and the tag <DISTANCE UNIT="m" DIRECTION="+"> shows that information about the distance has a unit which is expressed in m, the direction is {+}, and the description is 10, i.e., 10 m in the positive direction.

The next tag <INSIDE OF FACILITY TYPE="path" CLASS="name"> shows that the following information is the one about an inside of a facility and shows a "path", and the path is expressed as a "name" and its description is southern stairs, and the tag <DISTANCE UNIT="m" DIRECTION="second floor"> shows that information about the distance has a unit which is expressed in m, the direction is {second floor}, and its description is "null", i.e., the second floor.

The next tags starting from <INSIDE OF FACILITY TYPE="path" CLASS="name"> show that the following information is the one about an inside of a facility and shows a "path", and the path is expressed as a "name" and its description is an A path, and the tag <DISTANCE UNIT="m" DIRECTION="+"> shows that information about the distance has a unit which is expressed in m, the direction is {+}, and its description is 5, i.e., 5 m in the positive direction.

The next tag <connection> shows that the following information is the one about connection, and its description is right. The tags each of which starts from "</" and ends at ">" are termination processes of the corresponding tags, respectively.

Figure 10:
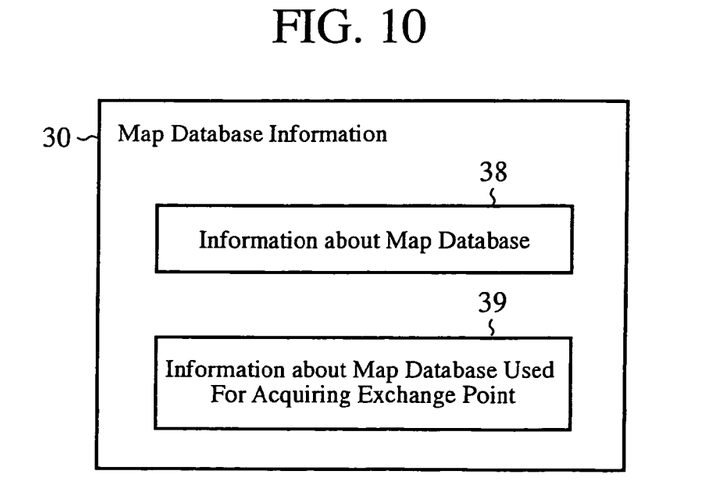
FIG. 10 is a diagram showing the structure of map database information for use in the location information exchange apparatus in accordance with Embodiment 1 of the present invention.

FIG. 10 is a diagram showing the structure of the map database information 30. This map database information 30 has a layered structure. The map database information 30 is comprised of information 38 about the map database and information 39 about the map database which is used for acquiring the exchange point 8.

The map database information 30 which is comprised of the information 38 about the map database and the information 39 about the map database which is used for acquiring the exchange point 8 can be expressed in the XML form. For example, when the map database information is expressed as follows:

```
<MAP DATABASE INFORMATION>
  <INFORMATION ABOUT MAP DATABASE>
    <MAKER>
    Map
    </MAKER>
    <CREATION YEAR>
    July, 2005
    </CREATION YEAR>
  </INFORMATION ABOUT MAP DATABASE>
  <INFORMATION ABOUT MAP DATABASE USED FOR
  ACQUIRING EXCHANGE
  POINT>
    <SECTION>
    2,710
    </SECTION>
    <SCALE>
    1/25,000
    </SCALE>
  </INFORMATION ABOUT MAP DATABASE USED FOR
  ACQUIRING EXCHANGE POINT>
</MAP DATABASE INFORMATION>,
``` the map database information 30 shows that the map is the one created by the map maker "Map" in July, 2005, the section of the map is 2,710, and the scale of the map is 1/25,000.

Using the information explained above, a certain exchange point can expressed in the XML form as follows:

```
<POINT EXCHANGE INFORMATION>
  <SPECIFIC POINT INFORMATION>
```

-continued

```
    <NAME CLASS="intersection">
    Miwa intersection
    </NAME>
  </SPECIFIC POINT INFORMATION>
  <RELATIVE VECTOR INFORMATION>
    <2D EXPRESSION="XY">
      <X UNIT="m">
      350
      </X>
      <Y UNIT="m">
      -200
      </Y>
    </2D>
  </RELATIVE VECTOR INFORMATION>
  <MAP DATABASE INFORMATION>
    <INFORMATION ABOUT MAP DATABASE>
      <MAKER>
      Map
      </MAKER>
      <CREATION YEAR>
      July, 2005
      </CREATION YEAR>
    </INFORMATION ABOUT MAP DATABASE>
  </MAP DATABASE INFORMATION>
</POINT EXCHANGE INFORMATION>
```

This XML document can show that the exchange point is the one acquired from the map database created by the map maker "Map" in July, 2005, and the point which is away from the specific point by 350 m in the X direction and by −200 m in the Y direction is the exchange point with the Miwa intersection being defined as the specific point.

As an alternative, the exchange point can be expressed as follows:

```
<POINT EXCHANGE INFORMATION>
  <SPECIFIC POINT INFORMATION>
    <NAME CLASS="intersection">
    Miwa intersection
    </NAME>
  </SPECIFIC POINT INFORMATION>
  <RELATIVE ROUTE INFORMATION>
    <OUTSIDE OF FACILITY TYPE="road" CLASS="road name">
    National road No. 176
    <DISTANCE UNIT="m" DIRECTION="+">
    200
    </DISTANCE>
    </OUTSIDE OF FACILITY>
  </RELATIVE ROUTE INFORMATION>
</POINT EXCHANGE INFORMATION>
```

This XML document can show that the point which is away from the specific point by 200 m in the positive direction along the national road No. 176 is the exchange point with the Miwa intersection being defined as the specific point. By thus expressing the exchange point with reference to a specific point, an abstracted expression of the exchange point can be provided with being freed from an expression using absolute coordinates. As a result, the matching between the different map databases can be carried out.

Figure 11:
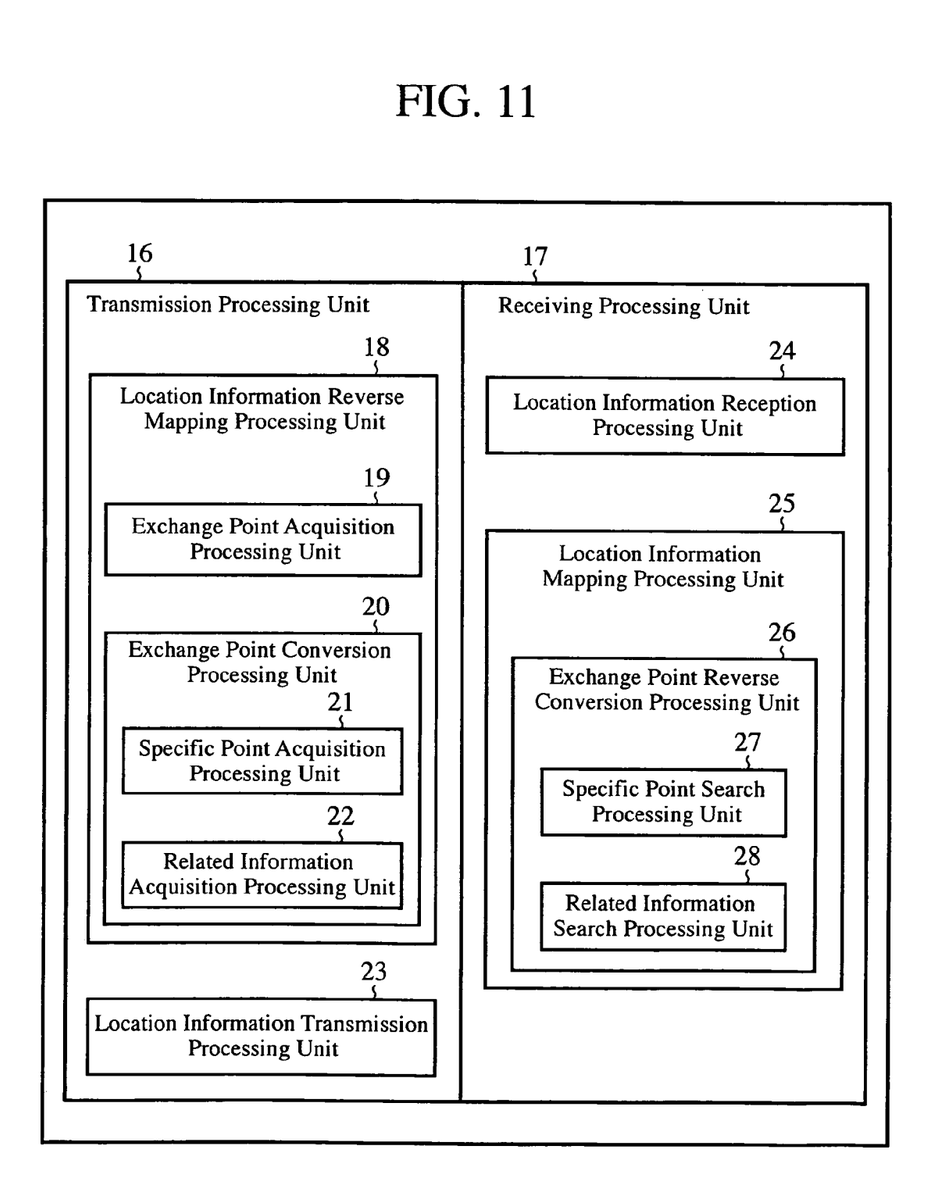
FIG. 11 is a diagram showing the structure of software which is installed into the location information exchange apparatus in accordance with Embodiment 1 of the present invention.

FIG. 11 is a diagram showing the structure of software installed into the location information exchange apparatus in accordance with Embodiment 1 of the present invention. This software is modularized and is substantially comprised of a transmission processing unit 16 and a reception processing unit 17.

The transmission processing unit 16 is comprised of a location information reverse mapping processing unit 18 and a location information transmission processing unit 23. This transmission processing unit 16 starts a process by using an HMI (Human Machine Interface) provided by the location information exchange apparatus in response to an instruction for transmitting an exchange point which is provided by a user. When the transmission processing unit 16 starts the process, the location information reverse mapping processing unit 18 is started and generates structured point exchange information. The point exchange information generated by this location information reverse mapping processing unit 18 is sent to the location information transmission processing unit 23. The details of this location information reverse mapping processing unit 18 will be mentioned later.

The location information transmission processing unit 23 corresponds to the communications means 2, and transmits the point exchange information in which the structured location information formed by the location information reverse mapping processing unit 18 is included. The location information transmission processing unit 23 starts the process after the point exchange information is generated by the exchange point transform processing unit 20. The description of the process carried out by the location information transmission processing unit 23 varies according to the type of the communication apparatus which constructs the communications means 2, and the detailed explanation of the process will be omitted hereafter.

Next, the details of the location information reverse mapping processing unit 18 will be explained. The location information reverse mapping processing unit 18 is comprised of an exchange point acquisition processing unit 19 and an exchange point conversion processing unit 20. The exchange point acquisition processing unit 19 corresponds to the information acquisition means 4, and performs a process of extracting and acquiring an exchange point from the map database 6. This exchange point acquisition processing unit 19 starts a process by using the HMI provided by the location information exchange apparatus in response to the instruction of transmitting the exchange point which is provided by the user. The process carried out by this exchange point acquisition processing unit 19 varies according to the map database 6 and the type of the HMI provided by the location information exchange apparatus, and an example of the process will be explained below.

The exchange point acquisition processing unit 19 acquires information about the maker and the creation year of the map from index information included in the map database 6, and forms the information into structured information as information 38 about the map database. This structured information can be expressed in the XML form as follows:

```
<INFORMATION ABOUT MAP DATABASE>
<MAKER>
Map
</MAKER>
<CREATION YEAR>
July, 2005
</CREATION YEAR>
</INFORMATION ABOUT MAP DATABASE>
```

The exchange point acquisition processing unit 19 acquires the status of the map indicating the exchange point, i.e., the information about the section and scale of the map from the data index information included in the map database 6, and forms the information into structured information as information 39 about the map database used for acquiring the exchange point. This structured information can be expressed in the XML form as follows:

```
<INFORMATION ABOUT MAP DATABASE USED
FOR ACQUIRING EXCHANGE POINT>
<SECTION>
2,710
</SECTION>
<SCALE>
1/25,000
</SCALE>
</INFORMATION ABOUT MAP DATABASE USED
FOR ACQUIRING EXCHANGE POINT>
```

Thus, the map database information 30 structured as below is acquired from each index information included in the map database 6.

```
<MAP DATABASE INFORMATION>
<INFORMATION ABOUT MAP DATABASE>
<MAKER>
Map
</MAKER>
<CREATION YEAR>
July, 2005
</CREATION YEAR>
</INFORMATION ABOUT MAP DATABASE>
<INFORMATION ABOUT MAP DATABASE USED
FOR ACQUIRING EXCHANGE POINT>
<SECTION>
2,710
</SECTION>
<SCALE>
1/25,000
</SCALE>
</INFORMATION ABOUT MAP DATABASE USED
FOR ACQUIRING EXCHANGE POINT>
</MAP DATABASE INFORMATION>
```

The exchange point acquisition processing unit 19 also acquires the coordinates of the location of the exchange point from the map database 6 on the basis of the map information about the section and the scale selected by the user, and calls up the exchange point conversion processing unit 20 with these coordinates.

The exchange point conversion processing unit 20 corresponds to the information conversion means 3, and is comprised of a specific point acquisition processing unit 21 and a related information acquisition processing unit 22. When called up by the exchange point acquisition processing unit 19, this exchange point conversion processing unit 20 acquires the coordinates of the location of the exchange point extracted by this exchange point acquisition processing unit 19 and starts the process.

Hereafter, a case in which the relative vector information 14 is used as the related information 9 will be explained. When the exchange point conversion processing unit 20 starts the process, the specific point acquisition processing unit 21 first performs an "initial region search" process of searching for a specific point which exists within a specific region, e.g., a region having a radius of 200 m (this radius can be changed freely), whose center at the coordinates of the location of the exchange point acquired by the exchange point acquisition processing unit 19.

If the specific point acquisition processing unit cannot discover any specific point, the specific point acquisition processing unit performs a "region search" process of enlarging the radius by steps of 50 m (this length can be changed freely) until it discovers a specific point. When having discovered two or more specific points, the specific point acquisition processing unit performs an "attribute-based narrowing" process of extracting a specific point with a higher priority from the two or more specific points by using a priority parameter which is an attribute of specific points. When there are two or more specific points which are extracted on the basis of the attribute, the specific point acquisition processing unit performs a "distance-based narrowing" process of extracting a specific point which is the nearest to the exchange point from the two or more specific points.

As an alternative, the specific point acquisition processing unit can be constructed in such a way as to perform the "distance-based narrowing" process without performing the "attribute-based narrowing" process to extract an only specific point.

By thus extracting an only specific point, the specific point acquisition processing unit 21 acquires the specific point information 10 which is expressed as follows:

```
<SPECIFIC POINT INFORMATION>
<NAME CLASS="intersection">
Miwa intersection
</NAME>
</SPECIFIC POINT INFORMATION>
```

The specific point acquisition processing unit 21 then calls up the related information acquisition processing unit 22 with this specific point information 10.

On the basis of the coordinates of the exchange point and the coordinates of the specific point, the related information acquisition processing unit 22 acquires the relative vector information 14 which is expressed as follows:

```
<RELATIVE VECTOR INFORMATION>
<2D EXPRESSION="XY">
<X UNIT="m">
350
</X>
<Y UNIT="m">
−200
</Y>
</2D>
</RELATIVE VECTOR INFORMATION>
```

When acquiring the relative vector information, the related information acquisition processing unit 22 calls up the location information transmission processing unit 23.

By using the communications means 2, the location information transmission processing unit 23 transmits the point exchange information which the location information reverse mapping processing unit 18 has structured as follows:

```
<POINT EXCHANGE INFORMATION>
<SPECIFIC POINT INFORMATION>
<NAME CLASS="intersection">
Miwa intersection
</NAME>
</SPECIFIC POINT INFORMATION>
<RELATIVE VECTOR INFORMATION>
<2D EXPRESSION="XY">
<X UNIT="m">
350
</X>
<Y UNIT="m">
−200
</Y>
</2D>
</RELATIVE VECTOR INFORMATION>
<MAP DATABASE INFORMATION>
<INFORMATION ABOUT MAP DATABASE>
<MAKER>
Map
</MAKER>
<CREATION YEAR>
July, 2005
</CREATION YEAR>
</INFORMATION ABOUT MAP DATABASE>
<INFORMATION ABOUT MAP DATABASE USED
FOR ACQUIRING EXCHANGE POINT>
<SECTION>
2,710
</SECTION>
<SCALE>
1/25,000
</SCALE>
</INFORMATION ABOUT MAP DATABASE USED
FOR ACQUIRING EXCHANGE POINT>
</MAP DATABASE INFORMATION>
</POINT EXCHANGE INFORMATION>
```

Next, a case in which the relative route information 15 is used as the related information 9 will be explained. When the exchange point transform processing unit 20 starts the process, the related information acquisition processing section 22 first extracts a node on a road/path network which is close to the coordinates of the location of the exchange point acquired by the exchange point acquisition processing unit 19, defines the node as the start point, and then continues a reverse travel (search) for a lowest-cost road/path network extending in a direction opposite to the traveling direction on the road/path network extending from this node so as to search for up to a node which becomes a specific point. As a result, the related information 9 starting from the specific point, which is expressed as follows, is formed.

```
<RELATIVE ROUTE INFORMATION>
<OUTSIDE OF FACILITY TYPE="road" CLASS="road name">
National road No. 176
<DISTANCE UNIT="m" DIRECTION="+">
200
</DISTANCE>
</OUTSIDE OF FACILITY>
</RELATIVE ROUTE INFORMATION>
```

When acquiring the relative route information, the related information acquisition processing unit 22 calls up the specific point acquisition processing unit 21.

On the basis of the specific point acquired through the search by the related information acquisition processing unit 22, the specific point acquisition processing unit 21 acquires the specific point information 10 which is expressed as follows:

```
<SPECIFIC POINT INFORMATION>
<NAME CLASS="intersection">
Miwa intersection
</NAME>
</SPECIFIC POINT INFORMATION>
```

The specific point acquisition processing unit 21 then calls up the location information transmission processing unit 23 with this specific point information 10.

By using the communications means 2, the location information transmission processing unit 23 transmits the point exchange information which the location information reverse mapping processing unit 18 has structured as follows:

```
<POINT EXCHANGE INFORMATION>
<SPECIFIC POINT INFORMATION>
<NAME CLASS="intersection">
Miwa intersection
</NAME>
</SPECIFIC POINT INFORMATION>
<RELATIVE ROUTE INFORMATION>
<OUTSIDE OF FACILITY TYPE="road" CLASS="road name">
National road No. 176
<DISTANCE UNIT="m" DIRECTION="+">
200
</DISTANCE>
</OUTSIDE OF FACILITY>
</RELATIVE ROUTE INFORMATION>
<MAP DATABASE INFORMATION>
<INFORMATION ABOUT MAP DATABASE>
<MAKER>
Map
</MAKER>
<CREATION YEAR>
July, 2005
</CREATION YEAR>
</INFORMATION ABOUT MAP DATABASE>
<INFORMATION ABOUT MAP DATABASE USED FOR ACQUIRING EXCHANGE POINT>
<SECTION>
2,710
</SECTION>
<SCALE>
1/25,000
</SCALE>
</INFORMATION ABOUT MAP DATABASE USED FOR ACQUIRING EXCHANGE POINT>
</MAP DATABASE INFORMATION>
</POINT EXCHANGE INFORMATION>
```

Next, the reception processing unit 17 will be explained. The reception processing unit 17 is comprised of a location information reception processing unit 24 which corresponds to the communications means 2, and a location information mapping processing unit 25 which corresponds to the information conversion means 3. The reception processing unit 17 starts a process when receiving point exchange information transmitted from another location information exchange apparatus.

When the reception processing unit 17 starts the process, the location information reception processing unit 24 first receives the point exchange information which is expressed as follows:

```
<POINT EXCHANGE INFORMATION>
<SPECIFIC POINT INFORMATION>
<NAME CLASS="intersection">
Miwa intersection
</NAME>
</SPECIFIC POINT INFORMATION>
<RELATIVE VECTOR INFORMATION>
<2D EXPRESSION="XY">
<X UNIT="m">
350
</X>
<Y UNIT="m">
```

-continued

```
−200
</Y>
</2D>
</RELATIVE VECTOR INFORMATION>
<MAP DATABASE INFORMATION>
<INFORMATION ABOUT MAP DATABASE>
<MAKER>
Map
</MAKER>
<CREATION YEAR>
July, 2005
</CREATION YEAR>
</INFORMATION ABOUT MAP DATABASE>
<INFORMATION ABOUT MAP DATABASE USED FOR ACQUIRING EXCHANGE POINT>
<SECTION>
2,710
</SECTION>
<SCALE>
1/25,000
</SCALE>
</INFORMATION ABOUT MAP DATABASE USED FOR ACQUIRING EXCHANGE POINT>
</MAP DATABASE INFORMATION>
</POINT EXCHANGE INFORMATION>
```

When completing the reception of the point exchange information, the location information reception processing unit 24 calls up the location information mapping processing unit 25. The description of the process carried out by the location information receiving processing unit 24 varies according to the type of the communication apparatus which constructs the communications means 2, and the detailed explanation of the process will be omitted hereafter.

The location information mapping processing unit 25 includes an exchange point reverse conversion processing unit 26, and this exchange point reverse conversion processing unit 26 is comprised of a specific point search processing unit 27 and a related information search processing unit 28. The specific point search processing unit 27 starts a process in response to a call accompanied by the received point exchange information, which is made by the location information reception processing unit 24.

When the map database information 30 is included in the received point exchange information, the specific point search processing unit 27 compares the map database 6 held thereby with the information 38 about the map database of the received map database information 30, and checks the difference between the map database 6 and the map database shown by the information 38. The specific point search processing unit then makes a comparison between the map database 6 and each element of the information 38 about the map database, sets its comparison result to "0" when there is a match between them, or sets it to "1" otherwise, and accumulates the comparison result of each element and saves the accumulated result as error information. Next, the specific point search processing unit selects a section and a scale of the map database 6 for searching for a specific point by using the information 39 about the map database used for acquiring the exchange point.

In contrast, when the map database information 30 is not included in the received point exchange information, the specific point search processing unit 27 maximizes the error information, and, when the information 39 about the map database used for acquiring the exchange point is not included in the received point exchange information, sets, as the scale, a preset scale and sets the section to be unknown.

Next, the specific point search processing unit 27 searches for specific point information 10 on the map database 6 by using the scale and the section which are acquired as above so as to determine a specific point. The specific point search processing unit then expands the map database 6 with the specific point being centered, and calls up the related information search processing unit 28.

The related information search processing unit 28 judges whether the related information 9 is either relative vector information 14 or relative route information 15, and, when the related information 9 is relative vector information 14, determines the exchange point by defining, as the center, the specific point determined by the specific point search processing unit 27 and then analyzing the relative vector information 14 which is expressed as follows:

```
<RELATIVE VECTOR INFORMATION>
<2D EXPRESSION="XY">
<X UNIT="m">
350
</X>
<Y UNIT="m">
−200
</Y>
</2D>
</RELATIVE VECTOR INFORMATION>
```

In contrast, when the related information 9 is relative route information 15, the related information search processing unit 28 determines the exchange point by defining, as the start point, the specific point determined by the specific point search processing unit 27, and then analyzing the relative route information 15 which is expressed as follows:

```
<RELATIVE ROUTE INFORMATION>
<OUTSIDE OF FACILITY TYPE="road" CLASS="road name">
National road No. 176
<DISTANCE UNIT="m" DIRECTION="+">
200
</DISTANCE>
</OUTSIDE OF FACILITY>
</RELATIVE ROUTE INFORMATION>
```

The exchange point determined by the related information search processing unit 28 is provided for the user by using the HMI provided by the location information exchange apparatus. The information indicating the exchange point which is provided for the user can be expressed by using one of various methods, such as a method of displaying the point on a displayed map, and a method of displaying the point with characters.

INDUSTRIAL APPLICABILITY

As mentioned above, the location information exchange apparatus and the location information exchange method in accordance with the present invention are suitable for providing a location information exchange apparatus for and a location information exchange method of being able to exchange correct location information between apparatuses having different map databases through transmission with a small amount of data in spite of having a simple structure.

The invention claimed is:

1. A location information exchange apparatus comprising:
a map database for storing map information;
an information acquisition unit for acquiring point information indicating an exchange point whose location is to be exchanged from said map database according to an instruction from outside the location information exchange apparatus;
an information conversion unit for converting the point information acquired by said information acquisition unit into location information which is comprised of specific point information indicating a specific point which exists in common among a plurality of map databases and related information indicating a relative location with respect to this specific point; and
a communications unit for transmitting point exchange information including the location information acquired through the conversion by said information conversion unit to outside the location information exchange apparatus.

2. The location information exchange apparatus according to claim 1, wherein the communications unit receives point exchange information from outside the location information exchange apparatus, and the information conversion unit converts location information included in the point exchange information received by said communications unit into point information, and determines an exchange point on the map database on a basis of the point information which is acquired through said conversion.

3. The location information exchange apparatus according to claim 2, wherein the specific point is at least one of a reference point in a map section, an intersection which serves as a start point of a pass road or a sidewalk, an entrance in a building, a landmark meaning a specific place in a real world, a famous point, such as a place of natural beauty or historic interest, and a reference point determined by a public institution.

4. The location information exchange apparatus according to claim 2, wherein the specific point information includes information indicating at least one of a name, an ID, and coordinates.

5. The location information exchange apparatus according to claim 2, wherein the related information is comprised of either relative vector information about a relative vector starting from the specific point or relative route information about a relative route starting from the specific point, said relative vector information includes at least one of information indicating a two-dimensional direction and a two-dimensional distance from the specific point, and information indicating a three-dimensional direction and a three-dimensional distance from the specific point, and said relative route information includes at least one of:
information indicating information about roads on a route, and a direction and a total distance on the route from the specific point,
information indicating a connected side with respect to an end point on the route, and
information indicating path information in a building on the route, and the direction and the total distance on the route.

6. The location information exchange apparatus according to claim 2, wherein the point exchange information includes map database information indicating a map database which is used when the information acquisition unit acquires the point information.

7. The location information exchange apparatus according to claim 6, wherein the map database information is comprised of information about a map database and information about the map database used for acquiring the exchange point, and the information about the map database includes at least one of a maker of the map database and a date and time of creation of the map database and the information on the map database used for acquiring the exchange point includes at least one of a scale of the map database and a section of the map database.

8. A location information exchange apparatus comprising:
a map database for storing map information;
a communications unit for receiving point exchange information including location information which is comprised of specific point information indicating a specific point which exists in common among a plurality of map databases and related information indicating a relative location with respect to this specific point from outside the location information exchange apparatus; and
an information conversion unit for converting the location information included in the point exchange information received by said communications unit into point information indicating a point whose location is to be exchanged so as to determine an exchange point whose location on said map database is to be exchanged on a basis of the point information which is acquired through said conversion.

9. A location information exchange method comprising:
acquiring point information indicating an exchange point whose location is to be exchanged from a map database according to an instruction from outside;
converting this acquired point information into location information which is comprised of specific point information indicating a specific point which exists in common among a plurality of map databases and related information indicating a relative location with respect to this specific point; and
transmitting point exchange information including the location information acquired through said conversion to outside.

10. The location information exchange method according to claim 9, wherein in the step of transmitting the point exchange information to outside, point exchange information is received from the outside, and, in the step of converting into point exchange information, location information included in said received point exchange information is converted into point information and an exchange point on the map database is determined on a basis of point information which is acquired through said conversion.

11. A location information exchange method comprising:
receiving point exchange information including location information which is comprised of specific point information indicating a specific point which exists in common among a plurality of map databases and related information indicating a relative location with respect to this specific point from outside; and
converting the location information included in the point exchange information received into point information indicating a point whose location is to be exchanged so as to determine an exchange point whose location on a map database is to be exchanged on a basis of the point information which is acquired through said conversion.

* * * * *